US012687852B2

(12) United States Patent
Giersiefer et al.

(10) Patent No.: US 12,687,852 B2
(45) Date of Patent: Jul. 21, 2026

(54) METHOD FOR OPERATING A MOTOR VEHICLE FOR OPERATION DURING A REMOTE PARKING PROCEDURE

(71) Applicant: Ford Global Technologies, LLC, Dearborn, MI (US)

(72) Inventors: Andreas Giersiefer, Leverkusen (DE); Markus Krekel, Wermelskirchen (DE); Florian Vieten, Meerbusch (DE); Torsten Cai Leonhard, Dormagen (DE)

( * ) Notice: Subject to any disclaimer, the term of this patent is extended or adjusted under 35 U.S.C. 154(b) by 211 days.

(21) Appl. No.: 18/624,511

(22) Filed: Apr. 2, 2024

(65) Prior Publication Data
US 2024/0370025 A1 Nov. 7, 2024

(30) Foreign Application Priority Data
May 3, 2023 (DE) .......................... 102023111448.4

(51) Int. Cl.
*B60W 30/06* (2006.01)
*G05D 1/224* (2024.01)
*G05D 109/10* (2024.01)

(52) U.S. Cl.
CPC .......... *G05D 1/2247* (2024.01); *B60W 30/06* (2013.01); *G05D 2109/10* (2024.01)

(58) Field of Classification Search
CPC .. G05D 1/2247; G05D 1/0016; G05D 1/0038; B60W 50/08
See application file for complete search history.

(56) References Cited

U.S. PATENT DOCUMENTS

| | | | |
|---|---|---|---|
| 10,583,830 B2 | 3/2020 | Lavoie et al. | |
| 2014/0222252 A1 | 8/2014 | Matters et al. | |
| 2015/0127208 A1 | 5/2015 | Jecker et al. | |
| 2019/0202348 A1 | 7/2019 | Elangovan et al. | |
| 2020/0257317 A1* | 8/2020 | Musk ..................... | G06N 20/00 |
| 2022/0161783 A1* | 5/2022 | Golgiri ................ | G06V 20/588 |

FOREIGN PATENT DOCUMENTS

| | | |
|---|---|---|
| DE | 102012200725 A1 | 7/2013 |
| DE | 102014007915 A1 | 12/2015 |
| DE | 102014011864 A1 | 2/2016 |
| WO | 2020224985 A1 | 11/2020 |

* cited by examiner

*Primary Examiner* — Kenneth J Malkowski
(74) *Attorney, Agent, or Firm* — Frank Lollo; Eversheds Sutherland (US) LLP

(57) ABSTRACT

The invention relates to a method for operating a motor vehicle during a remote parking procedure, having the steps of reading in a position and/or spatial location data set indicative of a position and/or spatial location of a mobile device of a driver during the remote parking procedure, generating an output data set based on a comparison of the position and/or spatial location data set with a predetermined position and/or spatial location for the mobile device, wherein the output data set contains data indicative of a deviation of a current position of the mobile device according to the position and/or spatial location data set from the predetermined position and/or spatial location, and outputting the output data set with the data indicative of the deviation via the mobile device.

12 Claims, 5 Drawing Sheets

METHOD FOR OPERATING A MOTOR VEHICLE FOR OPERATION DURING A REMOTE PARKING PROCEDURE

CROSS-REFERENCE TO RELATED APPLICATIONS

The application herein asserts priority to and incorporates by reference German Application No. 102023111448.4, filed on May 3, 2023.

FIELD OF THE INVENTION

The invention relates to a method for operating a motor vehicle during a remote parking procedure, a computer program product for a mobile device, a mobile device having such a computer program product and a system having such a mobile device and motor vehicle.

BACKGROUND

Remote-controlled parking assist takes over the maneuvering of a motor vehicle into and out of a parking space. The driver is able to concentrate solely on controlling the parking procedure. The driver may get out of the vehicle before it is parked in a parking space. Therefore, tight parking spaces in which the vehicle doors can barely be opened no longer present a problem.

When parking, the driver gets out of the vehicle before the selected parking space and starts the parking maneuver via remote control, e.g. via a mobile device, such as a smartphone. The motor vehicle parks in the parking space independently, without the driver being seated at the wheel. The remote-controlled parking assist brakes, steers and controls the engine and the brakes and the gearbox of the motor vehicle.

Again, the driver is not in the driver's seat of the motor vehicle when maneuvering out of the parking space and the motor vehicle exits the parking space autonomously. Only then does the driver get into the motor vehicle.

The driver remains responsible for monitoring the motor vehicle at all times and may terminate the remote parking procedure, such as the maneuvering into and out of a parking space, at any time. Furthermore, a type of deadman or alertness monitoring system monitors whether the driver is in the vicinity of the motor vehicle and is monitoring the procedure for maneuvering into or out of the parking space.

To this end, it is known, for example, from DE 10 2014 011 864 A1 to detect spatial location and position data via sensors of a smartphone of the driver and to monitor this data for sudden or otherwise abrupt changes. If such changes occur, the remote parking procedure, such as a procedure for maneuvering into and out of a parking a space, is terminated automatically before its completion.

Further methods for operating remote-controlled parking assist systems of this type are known, for example, from US 2019/0202348 A1, WO 2020, 224985 A1, DE 10 2012 200 725 A1, DE 102014 007 915 A1, U.S. Pat. No. 10,583,830 B2, US 2014/0222252 A1 and US 2015/0127208 A1.

However, in the method according to DE 10 2014 011 864 A1, unintentional movements on the part of the driver may lead to inadvertent termination during the remote parking procedure, such as a procedure for maneuvering into or out of a parking space. There is therefore a need to demonstrate ways in which improvements may be achieved in this regard.

SUMMARY

The object of the invention is achieved by a method for operating a motor vehicle during a remote parking procedure, having the steps:

reading in a position and/or spatial location data set indicative of a position and/or spatial location of a mobile device of a driver during a remote parking procedure, generating an output data set based on a comparison of the position and/or spatial location data set with a predetermined position and/or spatial location for the mobile device, wherein the output data set contains data indicative of a deviation of a current position of the mobile device according to the position and/or spatial location data set from the predetermined position and/or spatial location, outputting the output data set with the data indicative of the deviation via the mobile device.

During a remote parking procedure, the driver exits the motor vehicle before it moves autonomously into a parking space. Conversely, when exiting the parking space, the driver is not yet in the driver's seat in the motor vehicle and the motor vehicle exits the parking space autonomously. The driver then gets into the motor vehicle after it has stopped.

During the remote parking procedure, the driver remains responsible for monitoring the motor vehicle at all times and may terminate the procedure for maneuvering into or out of the parking space at any time. To this end, a type of deadman or alertness monitoring system is temporarily installed using the mobile device. A mobile device is understood to mean a terminal device, which, owing to its size and weight, can be carried without any significant physical effort and can therefore be used portably, e.g. a smartphone or a smart watch.

Such mobile devices have sensors for position and/or spatial location detection and may therefore provide a position and/or spatial location data set indicative of the position and/or spatial location of the mobile device.

Furthermore, such mobile devices have computing capacities in order to compare the position and/or spatial location data set with the predetermined position and/or spatial location of the mobile device and provide an output data set with data indicative of a deviation of a current position of the mobile device from the predetermined position and/or spatial location, which is then output via the mobile device.

Therefore, during the remote parking procedure, the driver is provided with additional information relating to the deviation of a current position of the mobile device from the predetermined position and/or spatial location. This makes it easier for the driver to hold the mobile device in the predetermined position and/or spatial location during the remote parking procedure and to avoid inadvertent termination of the remote parking procedure due to unintentional changes in position and/or spatial location.

According to one embodiment, in a further step, the predetermined position and/or spatial location is defined by the driver via the mobile device. Therefore, before the start of the mobile parking procedure, the driver is afforded the option of determining a personally comfortable position and/or spatial location of the mobile device in which the mobile device then remains during the remote parking procedure. The comfort is therefore increased.

According to a further embodiment, the output data set contains an image data set to be reproduced on a screen of the mobile device. The driver may thus be informed visually of the deviation of a current position of the mobile device according to the position and/or spatial location data set from the predetermined position. The operability may therefore be increased.

According to one embodiment, the image data set defines at least one boundary for a permissible maximum deviation, the exceedance of which results in the remote parking procedure being terminated. The driver is therefore provided with a simple visual representation of the risk of the remote parking procedure being terminated, e.g. via embedded boundary lines and a display indicative of the current spatial location and position of the mobile device in the illustrated screen content. In addition, it may be provided that an acoustic and/or haptic signal indicates a risk of the remote parking procedure being terminated due to an inadvertent proximity to the permissible maximum deviation.

A computer program product for a mobile device, a mobile device having such a computer product and a system having such a mobile device and motor vehicle furthermore belong to the invention.

BRIEF DESCRIPTION OF THE DRAWINGS

The invention is now explained with reference to a drawing, in which.

DETAILED DESCRIPTION

Figure 1:
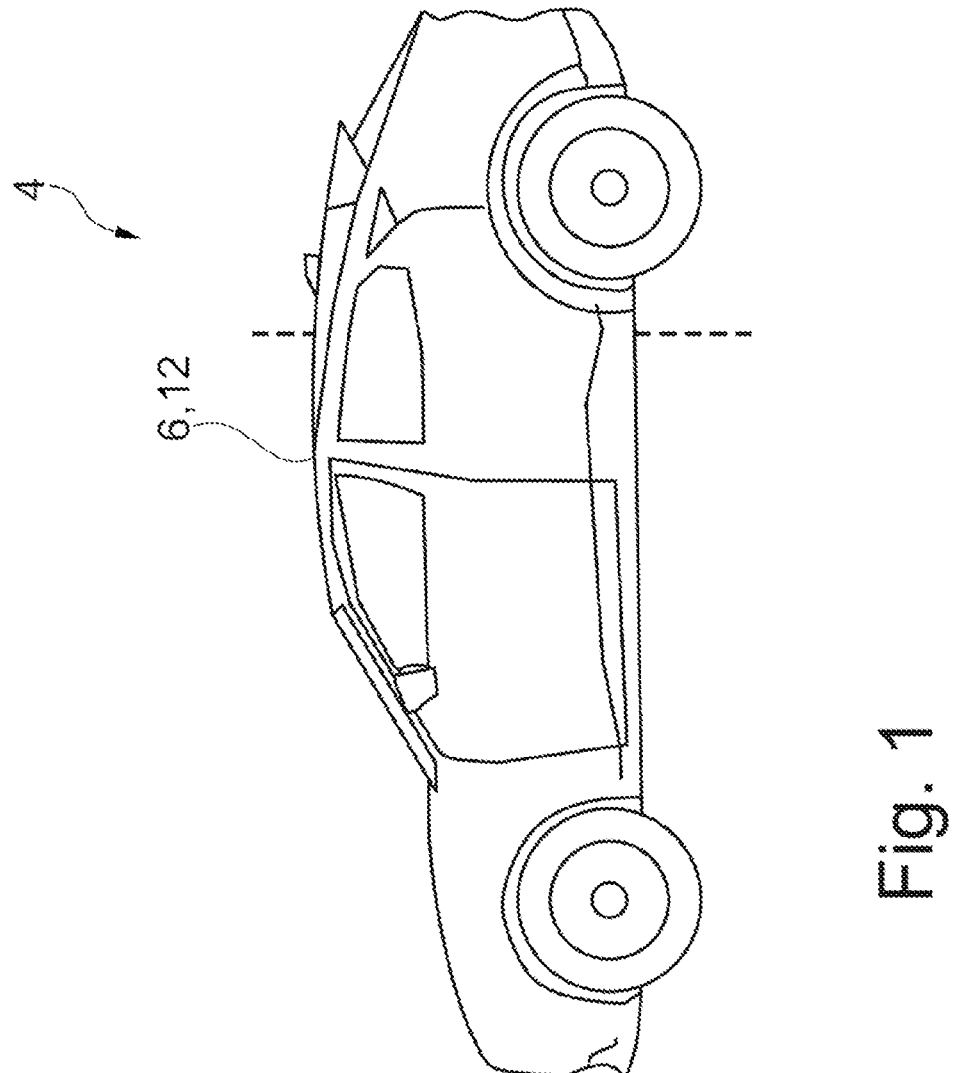
FIG. 1 shows, in a schematic illustration, components of a system for operating a motor vehicle.
Figure 1:
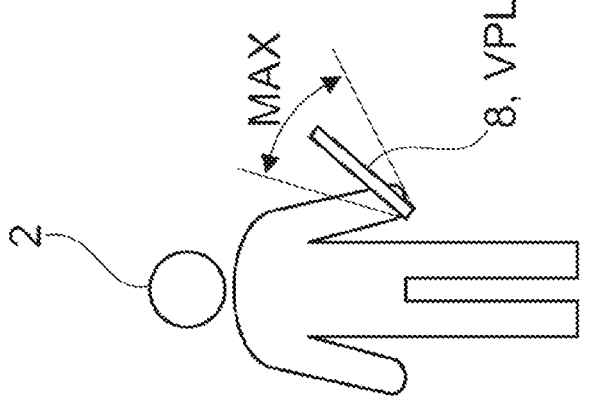

Reference is firstly made to FIG. 1.

A system 4 for operating a motor vehicle 6 is shown. In addition to the motor vehicle 6, the system comprises a mobile device 8 of a driver 2 of the motor vehicle 6. The motor vehicle 6 and the mobile device 8 have computer hardware and/or software components, each designed according to the tasks and functions described below.

The motor vehicle 6 in the present exemplary embodiment is designed as an automobile, whilst the mobile device 8 is designed as a smartphone.

A remote parking procedure may be carried out via the system 4. During this, the driver 2 exits the motor vehicle 6 before it moves autonomously into a parking space (not shown). A remote parking procedure may also involve maneuvering out of a parking space, during which the driver 2 is still not seated in the driver's seat of the motor vehicle 4 whilst the motor vehicle 2 exits the parking space autonomously.

So that the driver 2 is monitoring the remote parking procedure and may intervene if needed, a type of deadman or alertness monitoring system is temporarily initialized using the mobile device 8 before the start of the procedure for maneuvering into or out of a parking space.

To this end, for the duration of the procedure for maneuvering into or out of a parking space, the deadman or alertness monitoring system detects the position and/or spatial location of the mobile device 8 via sensors for position and/or spatial location detection of the mobile device 8 and transmits this position and/or spatial location wirelessly to a control device 12 of the motor vehicle 6.

The control device 12 compares the detected position and/or spatial location of the mobile device 8 with a predetermined position and/or spatial location VPL for the mobile device 8. If it is detected that the maximum deviation MAX has been exceeded, the control device 12 brings about the termination of the remote parking procedure via an engine-control and/or braking intervention. In a departure from the present exemplary embodiment, it may be provided that the mobile device 8 carries out the comparison of the detected position and/or spatial location of the mobile device 8 with the predetermined position and/or spatial location VPL. If it is detected that the maximum deviation MAX has been exceeded, the mobile device 8 brings about the termination of the remote parking procedure by activating the control device 12.

However, during the remote parking procedure, inadvertent or unintentional movements may occur on the part of the driver 2, for example, so that the maximum deviation MAX is exceeded and the remote parking procedure is therefore terminated.

Figure 2:
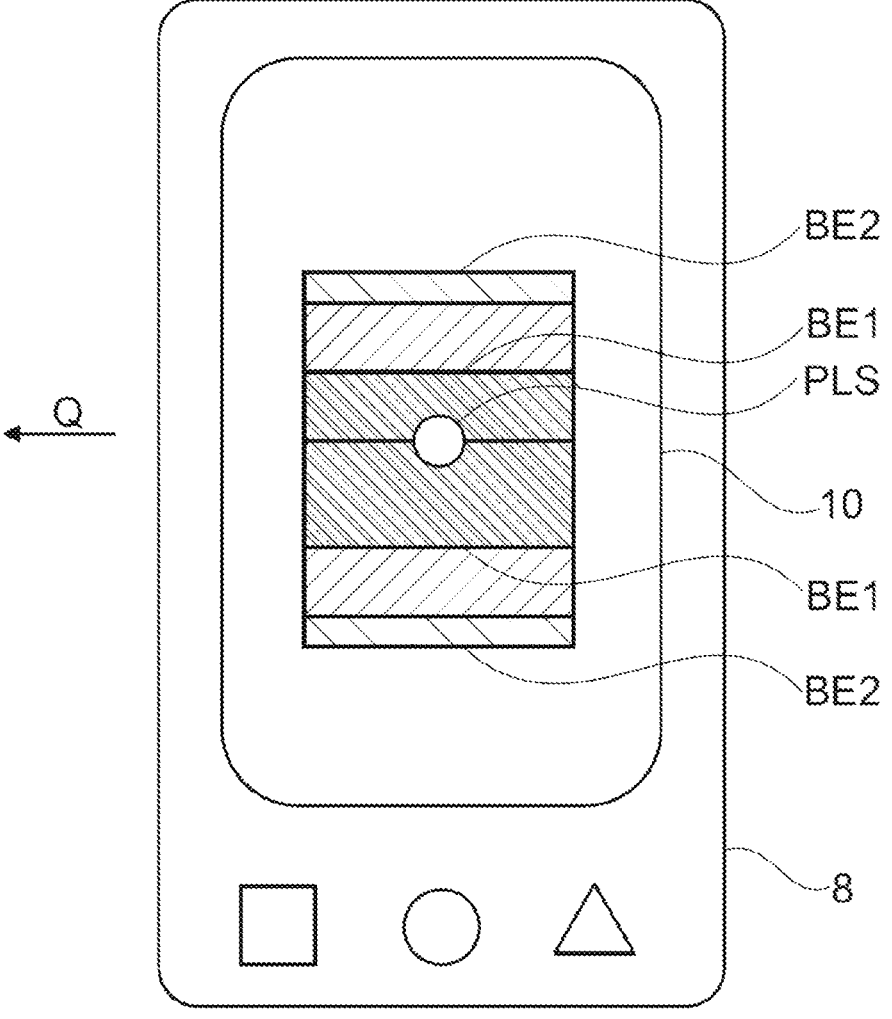
FIG. 2 shows, in a schematic illustration, a screen display according to a first exemplary embodiment.

Reference is now additionally made to FIG. 2 in order to explain how this type of inadvertent termination of a remote parking procedure may be counteracted.

The mobile device 8 is designed so that the predetermined position and/or spatial location VPL may be defined by the driver 2 in an initialization process.

To this end, the mobile device 8 may have a menu in which, for example, the initialization process is started as a result of an input on a screen 10, designed as a touch screen, of the mobile device 8, the mobile device 8 is then brought into a desired position and spatial location and, finally, the current position and spatial location is detected by the sensors of the mobile device 8 and stored as a predetermined position and/or spatial location VPL.

The predetermined position and/or spatial location VPL may comprise, for example, data relating to the position in Cartesian coordinates and/or the spatial location in three angle values, for example, and values for the gravitational force.

The mobile device 8 is furthermore designed such that, after the completion of the initialization process with the definition of the predetermined position and/or spatial location VPL and the start of the remote parking procedure, it detects data for the current position and spatial location of the mobile device 8 in a continuous manner, i.e. within a predetermined time interval, via its sensors and provides this data as a position and/or spatial location data set PLS indicative of the current position and/or spatial location of the mobile device 8.

Furthermore, the mobile device 8 is designed to transmit the predetermined position and/or spatial location VPL and the determined position and/or spatial location data set PLS wirelessly to the control device 12.

The control device 12 is designed to compare the determined position and/or spatial location data set PLS with the predetermined position and/or spatial location VPL and, based on the comparison, to bring about the termination of the remote parking procedure by activating the control device 12s X in the event that the maximum deviation MAX is exceeded.

Furthermore, the mobile device 8 is designed to generate an output data set ADS based on a comparison of the determined position and/or spatial location data set PLS with the predetermined position and/or spatial location VPL. The output data set ADS contains data indicative of a deviation AB of the current position according to the position and/or spatial location data set PLS from the predetermined position and/or spatial location VPL.

In a departure from the present exemplary embodiment, it may also be provided that the control device 12 generates the output data set ADS, which is then transmitted wirelessly to the mobile device 8 by the control device 12 X.

Finally, the mobile device 8 is designed to output the output data set ADS via the mobile device 8 to the screen 10 of this mobile device 8. In other words, the output data set ADS may contain an image data set BDS or it may consist exclusively of the image data set BDS.

In the present exemplary embodiment, it is provided that the image data set BDS defines at least one boundary BE1, BE2 for a permissible maximum deviation MAX, the exceedance of which results in the remote parking procedure being terminated. In other words, in the present exemplary embodiment, when reproducing the image data set BDS, in addition to the current position according to the position and/or spatial location data set PLS, the first boundaries BE1 and the second boundaries BE2 are embedded in the reproduced screen content.

In the present exemplary embodiment, the first boundaries BE1 and the second boundaries BE2 are designed as upper or lower boundary lines in each case. The respective upper and lower first boundary BE1 may be regarded as a pre-warning stage here, whilst the respective second boundary BE2 may symbolize a permissible maximum deviation MAX.

It may be provided that an acoustic and/or haptic signal is additionally output by the mobile device 8 if the respective upper and lower first boundaries BE1 are exceeded. It is therefore possible to indicate the acute risk of the remote parking procedure being terminated due to an inadvertent proximity to the permissible maximum deviation MAX.

By designing the first boundaries BE1 and the second boundaries BE2 as upper or lower boundary lines in each case, in the present exemplary embodiment it is possible to provide screen content which, in particular, makes it easier to monitor a rotation about a mobile device axis. In the present exemplary embodiment, the monitored mobile device axis is a mobile device transverse axis Q.

Figure 3:
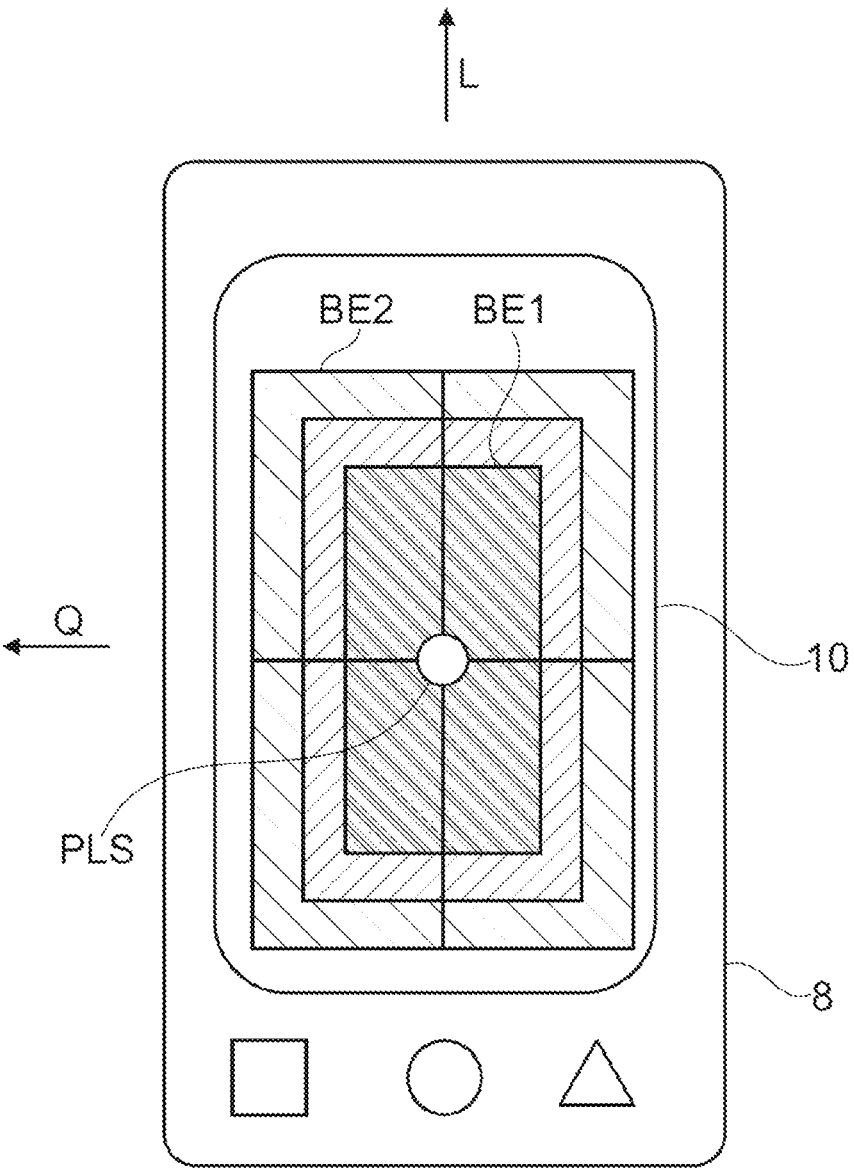
FIG. 3 shows, in a schematic illustration, a screen display according to a second exemplary embodiment.

Reference is now additionally made to FIG. 3.

In the present exemplary embodiment, the reproduced screen content differs from the screen content described with reference to FIG. 2 in that, instead of upper or lower boundary lines, the first boundary BE1 and the second boundary BE2 are now each designed in the form of a frame with a rectangular basic shape in the present exemplary embodiment.

With this design of the first boundary BE1 and the second boundary BE2, it is possible to provide screen content which, in particular, makes it easier to monitor a rotation about two mobile device axes. In the present exemplary embodiment, in addition to the mobile device transverse axis Q, the monitored mobile device axes are the mobile device longitudinal axes L.

Figure 4:
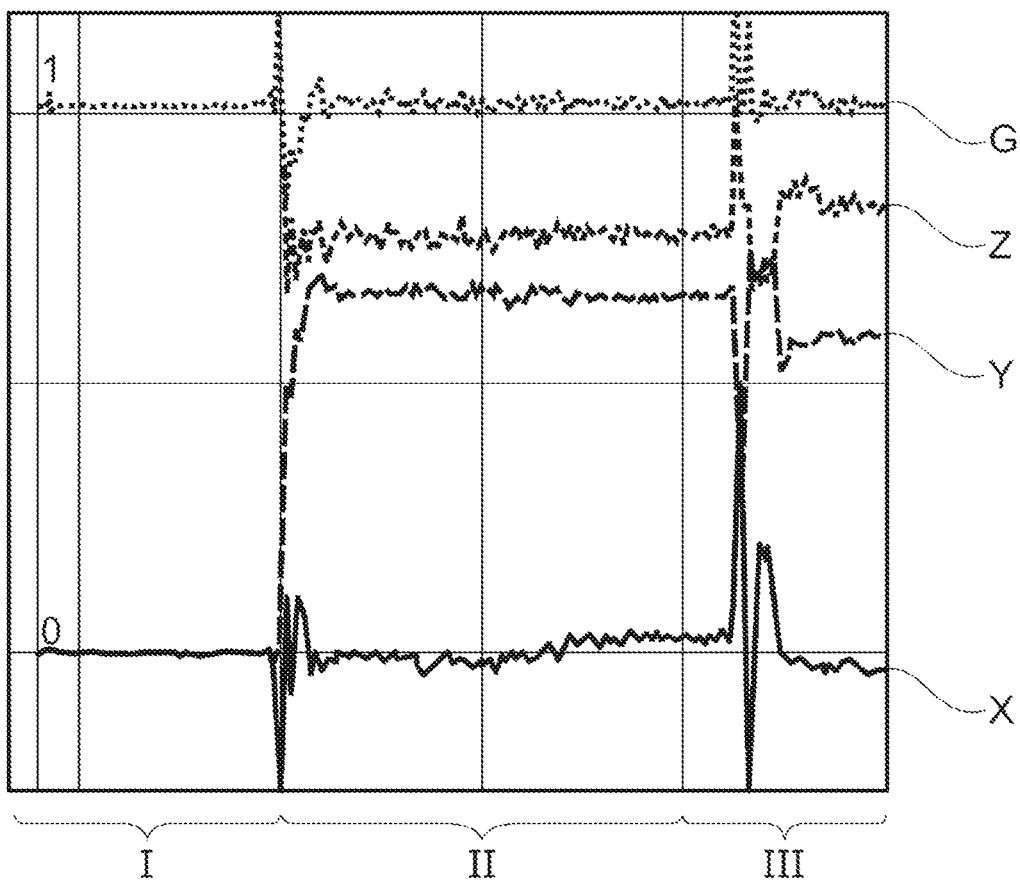
FIG. 4 shows, in a schematic illustration, different measurement values indicative of different measurement values.

Reference is now additionally made to FIG. 4.

Different measurement values are shown, which are detected by different sensors of the mobile device 8 in different positions and spatial locations of the mobile device 8.

The present exemplary embodiment shows three values X, Y, Z for the position of the mobile device 8 and a value G for the gravitational force, indicative of a rotation of the mobile device about its mobile device transverse axis Q, for example.

It is shown that, during a first phase I, the mobile device 8 is placed flat, e.g. on a tray; in a second phase II, it has been rotated through 45° about its mobile device transverse axis Q with respect to the first phase I; and in the third phase III, the permissible maximum deviation MAX has been exceeded.

Figure 5:
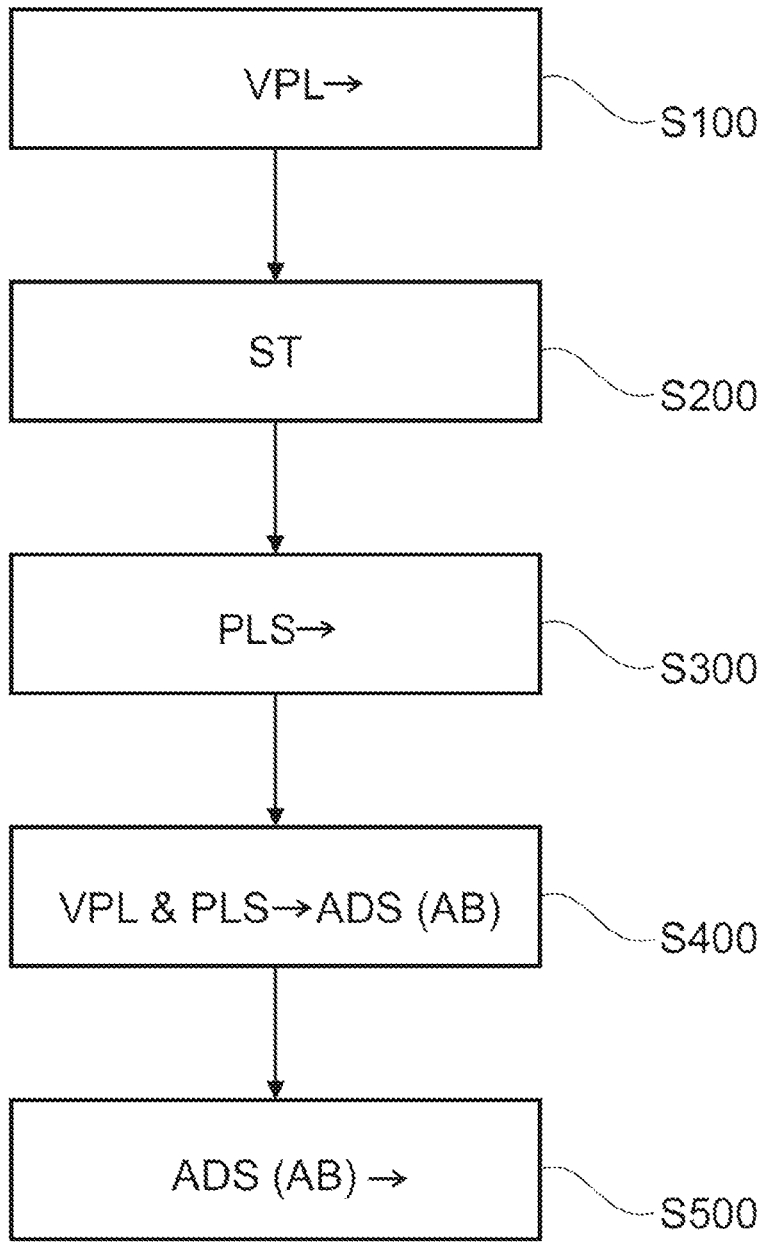
FIG. 5 shows, in a schematic illustration, a method sequence for operating the system shown in FIG. 1.

Reference is now additionally made to FIG. 5, in order to explain a method sequence for operating the system 2.

In a first step S100, the predetermined position and/or spatial location VPL is defined by the driver 2 via the mobile device 8.

In a further step S200, the remote parking procedure for maneuvering the motor vehicle 2 into or out of a parking space is started via a start signal ST.

In a further step S300, during the remote parking procedure, the position and/or spatial location data set PLS indicative of the current position and/or spatial location of the mobile device 8 of the driver 2 is now read in repeatedly within a predetermined time interval.

Furthermore, in a further step S400, the output data set ADS is collated in each case based on a comparison of the current position and/or spatial location data set PLS with the predetermined position and/or spatial location VPL for the mobile device 8. The output data set ADS here contains data indicative of the deviation AB of the current position of the mobile device 8 according to the position and/or spatial location data set PLS from the predetermined position and/or spatial location VPL.

Furthermore, in a further step S500, the output data set ADS with the data indicative of the deviation AB is output via the mobile device 8.

The output data set ADS here may contain an image data set BDS to be reproduced on a screen 10 of the mobile device 8, wherein the image data set BDS defines a boundary BE1, BE2 for a permissible maximum deviation MAX, the exceedance of which results in the remote parking procedure being terminated.

In a departure from the present exemplary embodiment, the sequence of the steps may also differ. Furthermore, multiple steps may also be executed concurrently or simultaneously. Furthermore, also in a departure from the present exemplary embodiment, individual steps may be skipped or omitted.

This makes it easier for the driver to hold the mobile device 8 in the predetermined position and/or spatial location VPL during the remote parking procedure and to avoid inadvertent termination of the remote parking procedure due to unintentional changes of position and/or spatial location.

LIST OF REFERENCE SIGNS

2 Driver
4 System
6 Motor vehicle
8 Mobile device
10 Screen
12 Control device
AB Deviation
ADS Output data set
BE1 Boundary
BE2 Boundary
G Value
L Mobile device longitudinal axis
MAX Maximum deviation
PLS Position and/or spatial location data set
Q Mobile device transverse axis
ST Start VPL Predetermined position and/or spatial location
X Value
Y Value
Z Value
I Phase
II Phase
III Phase
S100 Step
S200 Step
S300 Step
S400 Step
S500 Step

We claim:

1. A computer-implemented method for operating a motor vehicle during a remote parking procedure, comprising:

reading in, using one or more sensors of a mobile device, at least one of position or spatial location data set indicative of a position and/or spatial location of the mobile device of a driver during the remote parking procedure;

generating an output data set based on a comparison of the position and/or spatial location data set with a predetermined position and/or spatial location for the mobile device, wherein the output data set contains data indicative of a deviation of a current position of the mobile device according to the position and/or spatial location data set from the predetermined position and/or spatial location;

outputting the output data set with the data indicative of the deviation via the mobile device;

determining, based on the output data set, that the deviation exceeds a maximum deviation threshold; and stopping the motor vehicle and terminating the remote parking procedure.

2. The method according to claim 1, wherein the predetermined position and/or spatial location is defined by the driver via the mobile device.

3. The method according to claim 1, wherein the output data set contains an image data set that is displayed on a screen of the mobile device.

4. The method according to claim 3, wherein the image data set defines the maximum deviation threshold.

5. A mobile device for operating a motor vehicle during a remote parking procedure, comprising:

computer hardware and software, when executed, that causes the mobile device to:

determine, using one or more sensors of the mobile device, a position and/or spatial location data set indicative of a position and/or spatial location of the mobile device of a driver during the remote parking procedure;

generate an output data set based on a comparison of the position and/or spatial location data set with a predetermined position and/or spatial location for the mobile device, wherein the output data set contains data indicative of a deviation of a current position of the mobile device according to the position and/or spatial location data set from the predetermined position and/or spatial location;

output the output data set with the data indicative of the deviation via the mobile device;

determine that the deviation exceeds a maximum deviation threshold; and terminate the remote parking procedure.

6. The mobile device according to claim 5, wherein the predetermined position and/or spatial location can be defined by the driver via the mobile device.

7. The mobile device according to claim 5, wherein the output data set contains an image data that is reproduced on a screen of the mobile device.

8. The mobile device according to claim 7, wherein the image data set defines the maximum deviation threshold.

9. A system, comprising:

computer hardware and software, when executed, that causes the system to:

determine a position and/or spatial location data set indicative of a position and/or spatial location of a mobile device of a driver during the remote parking procedure, generate an output data set based on a comparison of the position and/or spatial location data set with a predetermined position and/or spatial location for the mobile device, wherein the output data set contains data indicative of a deviation of a current position of the mobile device according to the position and/or spatial location data set from the predetermined position and/or spatial location;

cause the output the output data set with the data indicative of the deviation via the mobile device;

determine that the deviation exceeds a maximum deviation threshold; and terminate the remote parking procedure.

10. The system according to claim 9, wherein the predetermined position and/or spatial location can be defined by the driver via the mobile device.

11. The system according to claim 9, wherein the output data set contains an image data set that is reproduced on a screen of the mobile device.

12. The system according to claim 11, wherein the image data set defines the maximum deviation threshold.

* * * * *